(12) United States Patent

Inoue et al.

(10) Patent No.: US 12,617,310 B2

(45) Date of Patent: May 5, 2026

(54) SYSTEM AND METHOD FOR CONTROLLING A WATERCRAFT INCLUDING DATA REDUCTION IN LOW POWER MODE

(71) Applicant: YAMAHA HATSUDOKI KABUSHIKI KAISHA, Iwata (JP)

(72) Inventors: Hiroshi Inoue, Shizuoka (JP); Hidehiko Harada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 810 days.

(21) Appl. No.: 17/982,702

(22) Filed: Nov. 8, 2022

(65) Prior Publication Data

US 2023/0249573 A1 Aug. 10, 2023

(30) Foreign Application Priority Data

Feb. 8, 2022 (JP) ................................. 2022-018272

(51) Int. Cl.

| | |
|---|---|
| *B60L 53/66* | (2019.01) |
| *B60L 53/65* | (2019.01) |
| *B63B 13/00* | (2006.01) |

(52) U.S. Cl.
CPC .............. *B60L 53/66* (2019.02); *B60L 53/65* (2019.02); *B63B 13/00* (2013.01); *B60L 2200/32* (2013.01)

(58) Field of Classification Search
CPC ......... B60W 2556/45; B60W 2556/50; B60W 2556/55; B60L 53/66; B60L 53/65;

(Continued)

(56) References Cited

U.S. PATENT DOCUMENTS

| | | | | |
|---|---|---|---|---|
| 2017/0263120 | A1* | 9/2017 | Durie, Jr. ............... | G08G 1/205 |
| 2022/0219669 | A1* | 7/2022 | Shiraiwa ................. | B60L 58/12 |
| 2023/0399078 | A1* | 12/2023 | Smith ..................... | B63B 27/30 |

FOREIGN PATENT DOCUMENTS

| | | | | |
|---|---|---|---|---|
| JP | 2010-167902 A | 8/2010 | | |
| JP | 2011-113538 A | 6/2011 | | |
| WO | WO-2012121815 A1 * | 9/2012 | ........ | H04W 52/0274 |

OTHER PUBLICATIONS

Extended European Search Report in EP22206639.1, mailed Jun. 7, 2023, 10 pages.

* cited by examiner

*Primary Examiner* — David V Henze-Gongola

(74) *Attorney, Agent, or Firm* — Keating & Bennett, LLP

(57) ABSTRACT

A control system for a watercraft includes a device system, a communication device, a controller, a first battery, and an electric power receiver. The communication device performs wireless communication with a server. The first battery provides electric power to the communication device. The electric power receiver is installed in the watercraft, connected to the first battery, and operable to receive shore power. The controller is configured or programmed to send device data to the server in a normal electric power mode when the first battery is connected to the shore power. The controller is configured or programmed to send the device data to the server in a low electric power mode when a low electric power condition, including a condition that the first battery is not connected to the shore power, is satisfied. The controller is configured or programmed to reduce data traffic of the device data to be sent to the server in the low electric power mode compared to when in the normal electric power mode.

18 Claims, 6 Drawing Sheets

(58) Field of Classification Search
CPC .................. B60L 2200/32; B63H 20/00; B63J
2003/043; H04W 4/44; B63B 13/00
See application file for complete search history.

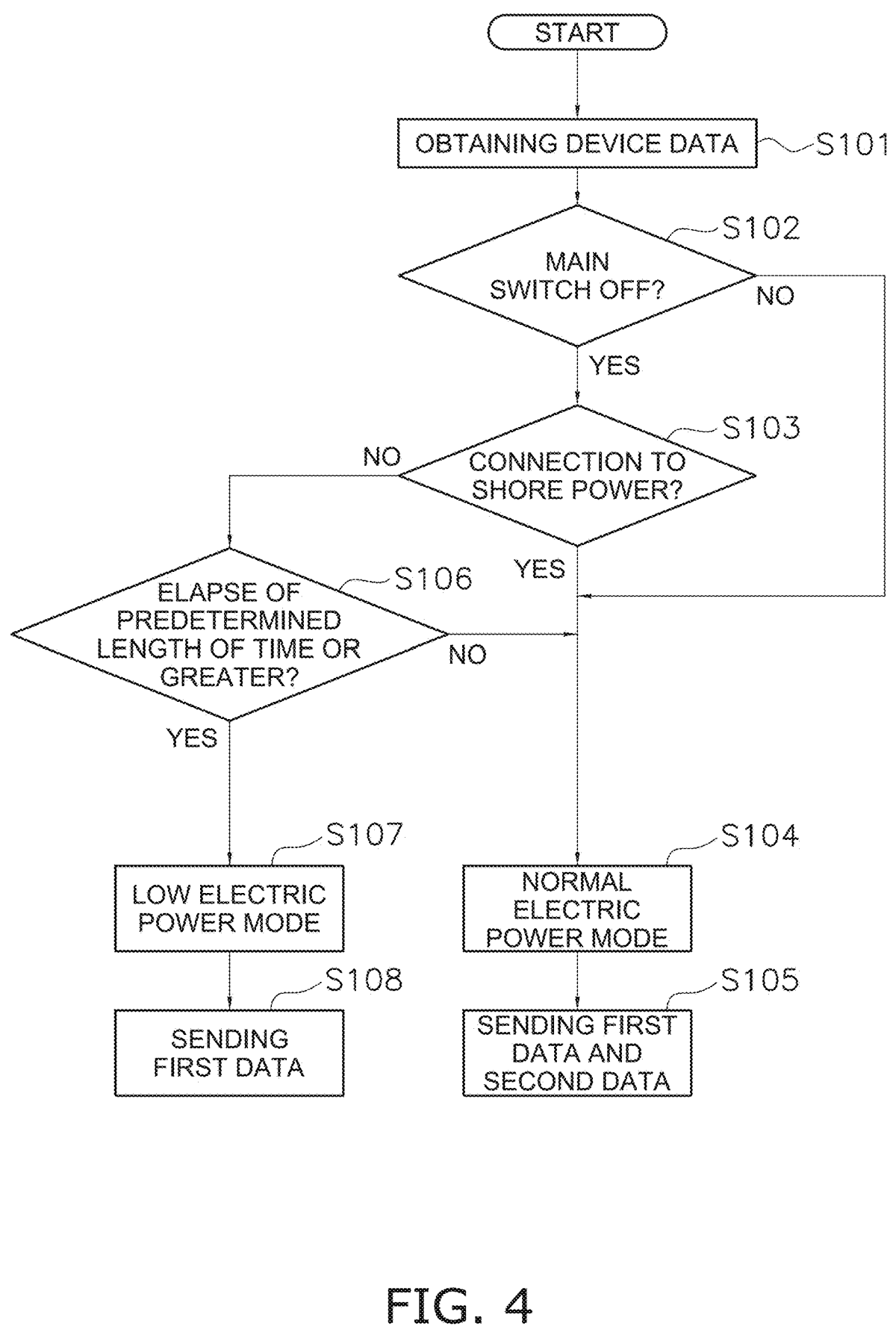

START

OBTAINING DEVICE DATA — S101

S102

MAIN SWITCH OFF? — NO

YES

S103

CONNECTION TO SHORE POWER?

NO

YES

S106

ELAPSE OF PREDETERMINED LENGTH OF TIME OR GREATER?

NO

YES

S107

LOW ELECTRIC POWER MODE

S104

NORMAL ELECTRIC POWER MODE

S108

SENDING FIRST DATA

S105

SENDING FIRST DATA AND SECOND DATA

FIG. 4

SYSTEM AND METHOD FOR CONTROLLING A WATERCRAFT INCLUDING DATA REDUCTION IN LOW POWER MODE

CROSS REFERENCE TO RELATED APPLICATIONS

This application claims the benefit of priority to Japanese Patent Application No. 2022-018272 filed on Feb. 8, 2022. The entire contents of this application are hereby incorporated herein by reference.

BACKGROUND OF THE INVENTION

1. Field of the Invention

The present invention relates to a system for and a method of controlling a watercraft.

2. Description of the Related Art

There is a type of watercraft including a communication device for performing wireless communication with a server. For example, Japan Laid-open Patent Application Publication No. 2011-113538 describes a watercraft including a communication device communicable with a server over the Internet. A controller in the watercraft sends information regarding the watercraft obtained during navigation to the server through the communication device.

On the other hand, as described in Japan Laid-open Patent Application Publication No. 2010-167902, there is a type of watercraft electrified with shore power. For example, the watercraft is provided with an inlet for shore power. The inlet is connected through a cable to a power supply facility in a harbor. Accordingly, shore power is supplied to the watercraft from the power supply facility in the harbor and a battery in the watercraft is charged with the shore power.

Chances are that, even when moored in the harbor, the watercraft is required to communicate with the server through the communication device due to, for instance, such a reason as monitoring the status of the watercraft. In this case, as long as the watercraft is being electrified with the shore power, the watercraft is able to continue the communication with the server through the communication device without concerns about running out of electric power in the battery.

However, unless the watercraft is being electrified with the shore power, the battery running out is a concern when the watercraft continues to communicate with the server through the communication device.

SUMMARY OF THE INVENTION

Preferred embodiments of the present invention enable watercraft to communicate with a server through a communication device, and simultaneously, to inhibit a battery from running out of electric power even when the watercraft is not being provided with shore power.

A system for controlling a watercraft according to a preferred embodiment of the present invention includes a device system, a communication device, a controller, a first battery, and an electric power receiver. The device system includes at least one electric device installed in the watercraft. The communication device is operable to perform wireless communication with a server. The controller is connected to the communication device, and configured or programmed to send device data regarding the device system to the server. The first battery is installed in the watercraft, and provides electric power to the communication device. The electric power receiver is installed in the watercraft, connected to the first battery, and operable to receive shore power. The controller is configured or programmed to determine whether or not the first battery is connected to the shore power, and send the device data to the server in a normal electric power mode when the first battery is connected to the shore power. The controller is configured or programmed to determine whether or not a low electric power condition, including a condition that the first battery is not connected to the shore power, is satisfied, and send the device data to the server in a low electric power mode when the low electric power condition is satisfied. The controller is configured or programmed to reduce data traffic of the device data to be sent to the server in the low electric power mode compared to when in the normal electric power mode.

A method according to another preferred embodiment of the present invention relates to a method of controlling a watercraft. The watercraft includes a device system, a communication device, a first battery, and an electric power receiver. The device system includes at least one electric device installed in the watercraft. The communication device is operable to perform wireless communication with a server. The first battery is installed in the watercraft, and provides electric power to the communication device. The electric power receiver is installed in the watercraft, connected to the first battery, and operable to receive shore power. The method includes sending device data regarding the device system to the server, determining whether or not the first battery is connected to the shore power, sending the device data to the server in a normal electric power mode when the first battery is connected to the shore power, determining whether or not a low electric power condition, including a condition that the first battery is not connected to the shore power, is satisfied, sending the device data to the server in a low electric power mode when the low electric power condition is satisfied, and reducing data traffic of the device data to be sent to the server in the low electric power mode compared to when in the normal electric power mode.

According to a preferred embodiment of the present invention, the device data is sent to the server in the low electric power mode when the low electric power condition, including the condition that the battery is not connected to the shore power, is satisfied. The data traffic of the device data to be sent to the server is reduced in the low electric power mode compared to when in the normal electric power mode. Because of this, the amount of electric power consumed in the communication device is reduced. Thus, the watercraft is able to communicate with the server through the communication device, and simultaneously, to inhibit the battery from running out even when not being supplied with the shore power.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a flowchart of a series of processes for sending device data to a server.

DETAILED DESCRIPTION OF THE PREFERRED EMBODIMENTS

Figure 1:
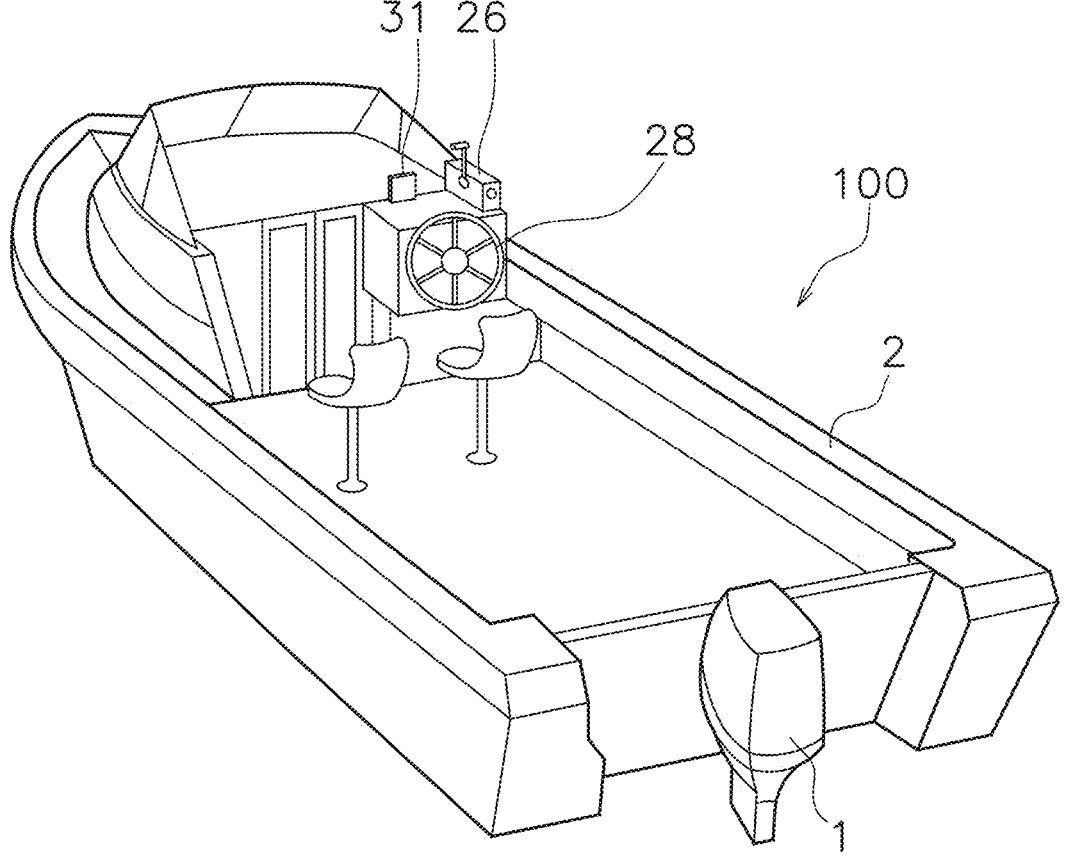
FIG. 1 is a perspective view of a watercraft according to a preferred embodiment of the present invention.

Preferred embodiments of the present invention will be hereinafter explained with reference to the drawings. FIG. 1 is a perspective view of a watercraft 100 according to a preferred embodiment of the present invention. The watercraft 100 includes a marine propulsion device 1 and a vessel body 2. The marine propulsion device 1 is attached to the stern of the vessel body 2. The marine propulsion device 1 generates a thrust to propel the watercraft 100. In the present preferred embodiment, the marine propulsion device 1 is an outboard motor.

Figure 2:
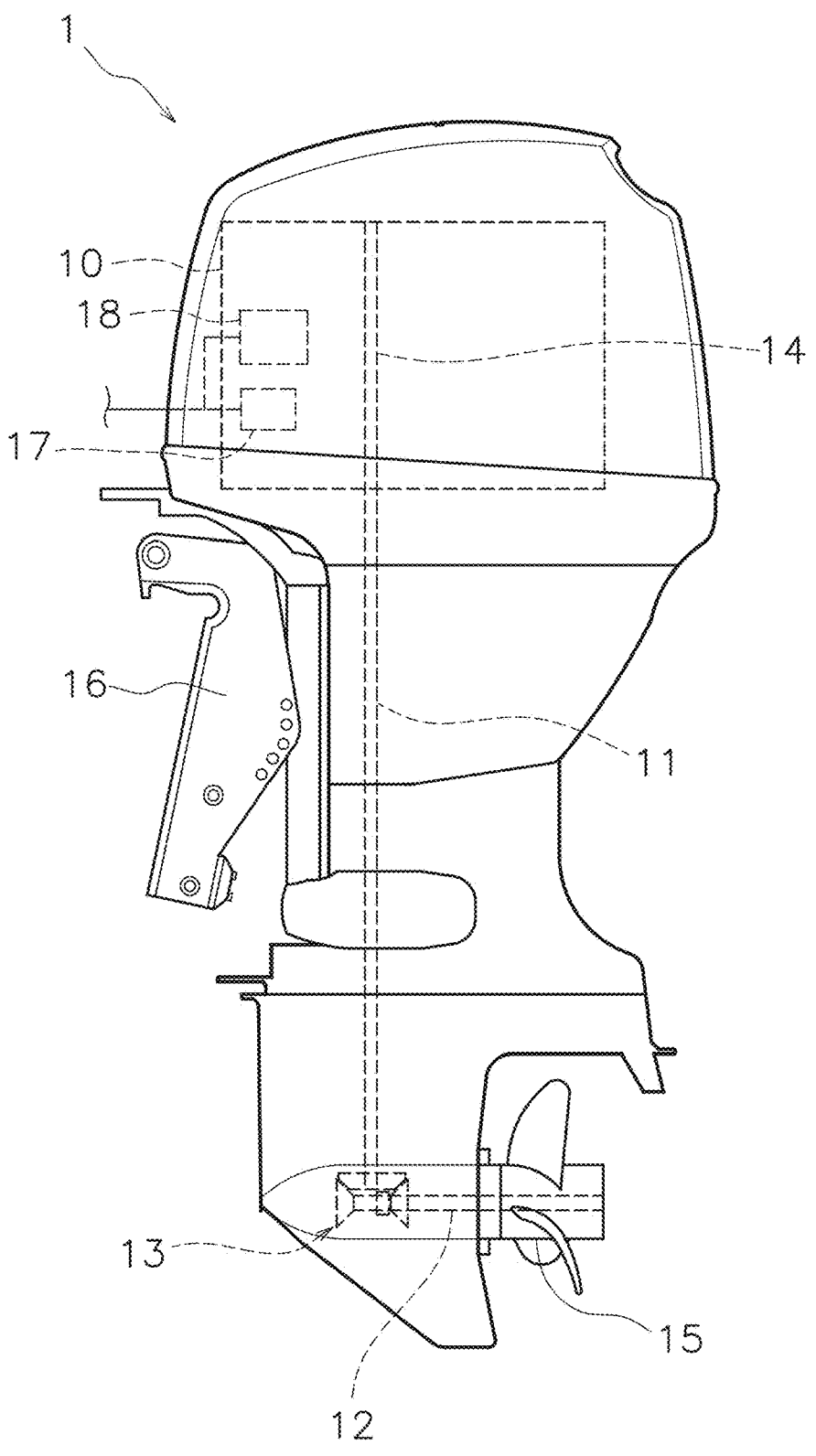
FIG. 2 is a side view of a marine propulsion device.

FIG. 2 is a side view of the marine propulsion device 1. As shown in FIG. 2, the marine propulsion device 1 includes a drive source 10, a drive shaft 11, a propeller shaft 12, and a shift mechanism 13. The drive source 10 generates the thrust to propel the watercraft 100. The drive source 10 includes, for instance, an internal combustion engine. The drive source 10 includes a crankshaft 14. The crankshaft 14 extends in the vertical direction. The drive shaft 11 is connected to the crankshaft 14. The drive shaft 11 extends in the vertical direction. The drive shaft 11 extends downward from the drive source 10.

The propeller shaft 12 extends in the back-and-forth direction of the marine propulsion device 1. The propeller shaft 12 is connected to the drive shaft 11 through the shift mechanism 13. A propeller 15 is connected to the propeller shaft 12. The shift mechanism 13 switches the rotational direction of mechanical power to be transmitted from the drive shaft 11 to the propeller shaft 12. The shift mechanism 13 includes, for instance, a plurality of gears and a clutch that changes meshing of the gears. The marine propulsion device 1 is attached to the watercraft 100 through a bracket 16.

The marine propulsion device 1 includes an ECU (Engine Control Unit) 17. The ECU 17 electrically controls the drive source 10. The ECU 17 includes a processor such as a CPU (Central Processing Unit) and memories such as a RAM (Random Access Memory) and a ROM (Read Only Memory). The marine propulsion device 1 includes an electric power generator 18. The electric power generator 18 is connected to the drive source 10. The electric power generator 18 generates electric power when driven by the drive source 10.

Figure 3:
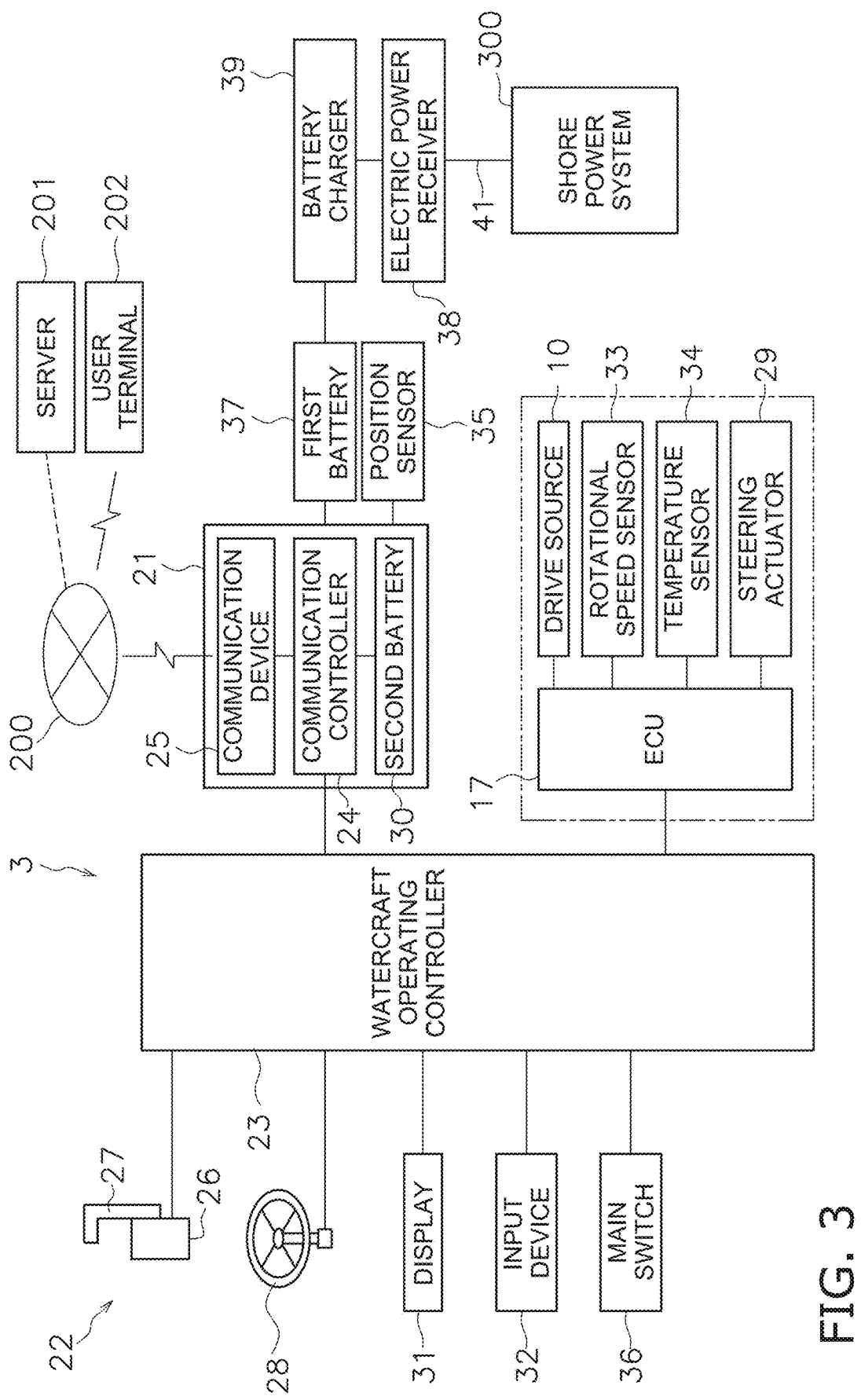
FIG. 3 is a schematic diagram of a control system for the watercraft.

FIG. 3 is a schematic diagram for showing a configuration of a control system 3 for the watercraft 100. As shown in FIG. 3, the control system 3 includes a data communication module (hereinafter referred to as "DCM") 21, a device system 22, and a watercraft operating controller 23.

The DCM 21 performs wireless communication with an external computer. The DCM 21 includes a communication controller 24, a communication device 25, and a second battery 30. The communication controller 24 includes a processor such as a CPU, memories such as a RAM and a ROM, and an auxiliary storage device such as an HDD (Hard Disk Drive) or an SSD (Solid State Drive). The communication controller 24 is connected to the communication device 25. The communication controller 24 controls the communication device 25. The second battery 30 is embedded in the DCM 21. The second battery 30 provides electric power to both the communication controller 24 and the communication device 25.

The communication device 25 is able to perform data transmission with the external computer through a mobile communication network 200. The mobile communication network 200 is, for instance, a network of a 3G, 4G, or 5G mobile communication system. The communication device 25 is communicable with a server 201. The communication device 25 is communicable with a user terminal 202. The user terminal 202 may be, for instance, a smartphone, a tablet, or a personal computer. The communication device 25 may be communicable with the user terminal 202 through the server 201.

The device system 22 includes electric devices installed in the watercraft 100. For example, the device system 22 includes the ECU 17 described above. The device system 22 includes a throttle-shift operating device 26. The throttle-shift operating device 26 is operable by an operator to regulate the rotational speed of the engine in the marine propulsion device 1. The throttle-shift operating device 26 is also operable by the operator to switch forward movement and rearward movement of the marine propulsion device 1.

The throttle-shift operating device 26 includes a throttle lever 27. The throttle lever 27 is operable from a neutral position to a forward moving position and a rearward moving position. The throttle-shift operating device 26 outputs a throttle signal indicating the operating position of the throttle lever 27. The ECU 17 receives the throttle signal outputted from the throttle-shift operating device 26. The ECU 17 controls the shift mechanism 13 in accordance with the operating position of the throttle lever 27. Accordingly, the rotation of the propeller shaft 12 is switched between a forward moving direction and a rearward moving direction. The ECU 17 controls the engine rotational speed in accordance with the operating position of the throttle lever 27.

The device system 22 includes a steering operating device 28 and a steering actuator 29. The steering actuator 29 turns the marine propulsion device 1 right and left so as to change the rudder angle of the marine propulsion device 1. The steering actuator 29 includes, for instance, an electric motor. Alternatively, the steering actuator 29 may include an electric pump and a hydraulic cylinder.

The steering operating device 28 is operable by the operator to adjust the rudder angle of the marine propulsion device 1. The steering operating device 28 includes, for instance, a steering wheel. Alternatively, the steering operating device 28 may be another type of operating device such as a joystick. The steering operating device 28 is operable right and left from a neutral position. The steering operating device 28 outputs a steering signal indicating the operating position thereof. The steering actuator 29 is controlled in accordance with the operating position of the steering operating device 28, such that the rudder angle of the marine propulsion device 1 is controlled.

The device system 22 includes a display 31 and an input device 32. The display 31 displays information regarding the marine propulsion device 1. The display 31 displays an image in response to an image signal inputted thereto. The input device 32 receives an operational input from a user. The input device 32 outputs an input signal indicating the operational input by the user. The input device 32 includes, for instance, a touchscreen. It should be noted that the input device 32 may include at least one hardware key.

The device system 22 includes a rotational speed sensor 33 and a temperature sensor 34. The rotational speed sensor 33 and the temperature sensor 34 are mounted to the marine propulsion device 1. The rotational speed sensor 33 outputs a signal indicating rotational speed data. The rotational speed data indicates the output rotational speed of the drive source 10. The temperature sensor 34 outputs a signal indicating temperature data. The temperature data indicates the temperature of the drive source 10.

The device system 22 includes a position sensor 35. The position sensor 35 detects the position of the watercraft 100. The position sensor 35 includes a GNSS (Global Navigation Satellite System) receiver such as a GPS (Global Positioning System). However, the position sensor 35 may be a type of sensor other than the GNSS receiver. The position sensor 35 outputs a position signal indicating the position of the watercraft 100.

The watercraft operating controller 23 includes a processor such as a CPU, memories such as a RAM and a ROM, and a storage such as an HDD and an SSD. The watercraft operating controller 23 stores programs and data to control the marine propulsion device 1. The watercraft operating controller 23 is connected to the ECU 17 through wired or wireless communication. The watercraft operating controller 23 is connected to the throttle-shift operating device 26 and the steering operating device 28 through wired or wireless communication.

The watercraft operating controller 23 receives the input signal outputted from the input device 32. The watercraft operating controller 23 sets the control of the marine propulsion device 1 in response to the input signal. The watercraft operating controller 23 outputs an image signal to the display 31 and causes the display 31 to display the information regarding the marine propulsion device 1.

The watercraft operating controller 23 obtains the rotational speed data from the rotational speed sensor 33. The watercraft operating controller 23 determines whether or not over-revolution of the drive source 10 is occurring based on the output rotational speed. For example, when the output rotational speed of the drive source 10 is greater than or equal to a predetermined threshold of the rotational speed, the watercraft operating controller 23 determines that over-revolution of the drive source 10 is occurring. When it is determined that over-revolution of the drive source 10 is occurring, the watercraft operating controller 23 causes the display 31 to display an alert. Alternatively, when it is determined that over-revolution of the drive source 10 is occurring, the watercraft operating controller 23 may turn on a warning lamp.

The watercraft operating controller 23 obtains the temperature data from the temperature sensor 34. The watercraft operating controller 23 determines whether or not overheating of the drive source 10 is occurring based on the temperature of the drive source 10. For example, when the temperature of the drive source 10 is greater than or equal to a predetermined threshold of the temperature, the watercraft operating controller 23 determines that overheating of the drive source 10 is occurring. When it is determined that overheating of the drive source 10 is occurring, the watercraft operating controller 23 causes the display 31 to display an alert. Alternatively, when it is determined that overheating of the drive source 10 is occurring, the watercraft operating controller 23 may turn on a warning lamp.

The control system 3 includes a main switch 36. When the main switch 36 is turned on, the drive source 10 is driven. During driving of the drive source 10, electric power generated in the electric power generator 18 is supplied to the device system 22. The control system 3 includes a first battery 37. The first battery 37 is disposed in the vessel body 2. Alternatively, the first battery 37 may be disposed in the marine propulsion device 1. When the drive source 10 is being driven, the first battery 37 is charged with the electric power supplied from the electric power generator 18.

The DCM 21 is connected to the first battery 37. The DCM 21 is supplied with electric power from the first battery 37. The position sensor 35 is connected to the DCM 21. The position sensor 35 is supplied with electric power from the first battery 37. Even when the main switch 36 is turned off, each of the DCM 21 and the position sensor 35 is supplied with the electric power from the first battery 37.

The control system 3 includes an electric power receiver 38 and a battery charger 39. The electric power receiver 38 is disposed in the vessel body 2. Alternatively, the electric power receiver 38 may be disposed in the marine propulsion device 1. The electric power receiver 38 is connected to the first battery 37 through the battery charger 39. The electric power receiver 38 is connected to a shore power system 300 through a cable 41. The shore power system 300 is disposed in a harbor on shore or so forth and supplies shore power to the watercraft 100. The electric power receiver 38 includes, for instance, a socket to which the cable 41 is connected. The electric power receiver 38 receives the shore power from the shore power system 300 through the cable 41.

When the electric power receiver 38 is connected to the shore power system 300, the first battery 37 is charged with the shore power. The battery charger 39 controls charging the first battery 37 with the shore power. For example, when the first battery 37 is fully charged, the battery charger 39 stops charging the first battery 37 with the shore power.

The DCM 21 collects device data regarding the device system 22 and sends the collected device data to the server 201. The DCM 21 collectively sends the device data to the server 201 at predetermined intervals of time. When the main switch 36 is turned on, the DCM 21 sends the device data to the server 201 in a normal electric power mode. When the main switch 36 is turned off, the DCM 21 switches between the normal electric power mode and a low electric power mode, as a mode to send the device data, in accordance with the status of the connection to the shore power.

The following explanation relates to controls executed by the DCM 21 to send the device data to the server 201. FIG. 4 is a flowchart of a series of processes to send the device data to the server 201.

As shown in FIG. 4, in step S101, the DCM 21 obtains the device data. For example, the DCM 21 obtains the position data, detected at predetermined intervals of time, from the position sensor 35 and stores the obtained position data. The DCM 21 obtains the rotational speed data, detected at predetermined intervals of time, from the rotational speed sensor 33 and stores the obtained rotational speed data. The DCM 21 obtains the temperature data, detected at predetermined intervals of time, from the temperature sensor 34 and stores the obtained temperature data.

In step S102, the DCM 21 determines whether or not the main switch 36 is turned off. When the main switch 36 is turned off, the process proceeds to step S103.

In step S103, the DCM 21 determines whether or not the first battery 37 is connected to the shore power. When the first battery 37 is connected to the shore power, the DCM 21 enters the normal electric power mode in step S104. In step S105, the DCM 21 sends both first data and second data, as the device data, to the server 201 in the normal electric power mode. It should be noted that, when the main switch 36 is turned on in step S102, the DCM 21 enters the normal electric power mode regardless of whether or not the first battery 37 is connected to the shore power. In other words, when the drive source 10 has been started, the DCM 21 enters the normal electric power mode regardless of whether or not the first battery 37 is connected to the shore power.

The first data refer to data regarding a first device and takes high priority as data to be sent to the server 201. The second data refers to data regarding a second device and takes lower priority than the first data as data to be sent to the server 201. In the present preferred embodiment, the position sensor 35 corresponds to the first device. Therefore, the first data corresponds to the position data indicating the position of the watercraft 100.

Each of the rotational speed sensor 33 and the temperature sensor 34 corresponds to the second device. Therefore, the second data includes the rotational speed data indicating the output rotational speed of the drive source 10. Besides, the second data includes the temperature data indicating the temperature of the drive source 10. In other words, the DCM 21 sends the device data, including the position data, the rotational speed data, and the temperature data, to the server 201 in the normal electric power mode.

When the first battery 37 is not connected to the shore power in step S103, the process proceeds to step S106. In step S106, the DCM 21 determines whether or not a predetermined length of time or more has elapsed since disconnection of the first battery 37 from the shore power. When the predetermined length of time or more has not elapsed yet since disconnection of the first battery 37 from the shore power, the DCM 21 maintains the normal electric power mode in step S104. When the predetermined length of time or more has elapsed since disconnection of the first battery 37 from the shore power, the process proceeds to step S107.

In step S107, the DCM 21 enters the low electric power mode. In other words, the DCM 21 enters the low electric power mode when low electric power conditions in steps S102, S103, and S106 are satisfied. The low electric power conditions include a condition that the drive source 10 has not been started yet, a condition that the first battery 37 is not connected to the shore power, and a condition that the predetermined length of time or more has elapsed since disconnection of the first battery 37 from the shore power.

In step S108, the DCM 21 sends the first data, as the device data, to the server 201 in the low electric power mode. In other words, the DCM 21 sends only the first data, as the device data, to the server 201 without sending thereto the second data as the device data. Therefore, in the low electric power mode, the DCM 21 sends, to the server 201, the device data that includes the position data but excludes both the rotational speed data and the temperature data.

Therefore, the data traffic of the device data to be sent to the server 201 in the low electric power mode is less than that of the device data to be sent to the server 201 in the normal electric power mode. Because of this, the data traffic of the device data to be sent to the server 201 is reduced in the low electric power mode compared to when in the normal electric power mode. It should be noted that when the main switch 36 is turned on in step S102, the DCM 21 sends the device data in the normal electric power mode.

In the control system 3 according to a preferred embodiment of the present invention, the device data is sent to the server 201 in the low electric power mode when the low electric power conditions, including the condition that the first battery 37 is not connected to the shore power, are satisfied. The data traffic of the device data to be sent to the server 201 is reduced in the low electric power mode compared to when in the normal electric power mode. Because of this, the amount of electric power consumed in the DCM 21 is reduced. Accordingly, the watercraft 100 is able to communicate with the server 201 through the DCM 21, and simultaneously, to inhibit the battery from running out of electric power even when not being supplied with the shore power.

Preferred embodiments of the present invention have been explained above. However, the present invention is not limited to the preferred embodiments described above, and a variety of changes can be made without departing from the gist of the present invention.

The marine propulsion device 1 is not limited to the outboard motor, and alternatively, may be another type of propulsion device such as an inboard engine outboard drive or a jet propulsion device. The structure of the marine propulsion device 1 is not limited to that in the preferred embodiments described above and may be changed. For example, the marine propulsion device 1 may include an electric motor instead of the drive source 10. The electric devices included in the device system 22 are not limited to those in the preferred embodiments described above. One or more other electric devices may be added to the electric devices; alternatively, some or all of the electric devices may be replaced by one or more other electric devices.

The processes in the normal electric power mode and in the low electric power mode are not limited to those in the preferred embodiments described above and may be changed. For example, the low electric power conditions may include one or more conditions other than the conditions described above. The low electric power conditions described above may be omitted in part. In the normal electric power mode, the DCM 21 may send the position data to the server 201 at predetermined intervals of time. The DCM 21 may determine whether or not the position of the watercraft 100 has shifted by a predetermined distance or more based on the position data. In the low electric power mode, the DCM 21 may be configured or programmed to send the position data to the server 201 only when the position of the watercraft 100 has shifted by the predetermined distance or more. In the low electric power mode, the DCM 21 may be configured or programmed not to send the position data to the server 201 unless the position of the watercraft 100 has shifted by the predetermined distance or more.

The DCM 21 may enter a sleep mode in the low electric power mode. In the sleep mode, the DCM 21 may stop communicating with the server 201. The DCM 21 may be switched from the sleep mode to a wake-up mode on a regular basis. In the wake-up mode, the DCM 21 may determine whether or not the DCM 21 has received a command signal from the server 201. The server 201 may continue to send the command signal to the communication device 25 at predetermined intervals of time. When having received the command signal from the server 201, the DCM 21 may be configured or programmed to send the device data to the server 201. When not having received the command signal from the server 201, the DCM 21 may be configured or programmed not to send the device data to the server 201.

When the DCM 21 is in the low electric power mode, either the DCM 21 or the server 201 may notify the user terminal 202 that the DCM 21 is in the low electric power mode. For example, either the DCM 21 or the server 201 may notify the user terminal 202 that the DCM 21 is in the low electric power mode by sending an email to the user terminal 202 or by causing an application in the user terminal 202 to display the notification. The DCM 21 may be switched to the low electric power mode in response to a command signal from the user terminal 202.

The DCM 21 may be further switchable to a storage mode. The DCM 21 may reduce the data traffic of the device data to be sent to the server in the storage mode compared to when in the low electric power mode. For example, the DCM 21 may reduce the interval of time for communication with the server 201 in the storage mode compared to when in the low electric power mode. The DCM 21 may reduce the amount of data of the device data in the storage mode compared to when in the low electric power mode. For example, in the storage mode, the DCM 21 may send only data to confirm SIM activation, as the first data, to the server 201 without sending thereto the position data as the first data.

The DCM 21 may be switched from the low electric power mode to the storage mode in accordance with operating circumstances of the device system 22. For example, the DCM 21 may be switched to the storage mode when the first battery 37 has not been charged for a predetermined period of time or more. The operating circumstance "the first battery 37 has not been charged for the predetermined period of time or more" may mean, for instance, that the drive source 10 has not been driven even once for the predetermined period of time or more, and simultaneously, has not been connected to the shore power even once.

When the DCM 21 is in the storage mode, either the DCM 21 or the server 201 may notify the user terminal 202 that the DCM 21 is in the storage mode. For example, either the DCM 21 or the server 201 may notify the user terminal 202 that the DCM 21 is in the storage mode by sending an email to the user terminal 202 or by causing the application in the user terminal 202 to display the notification. The DCM 21 may be switched to the storage mode in response to a command signal from the user terminal 202.

Figure 5:
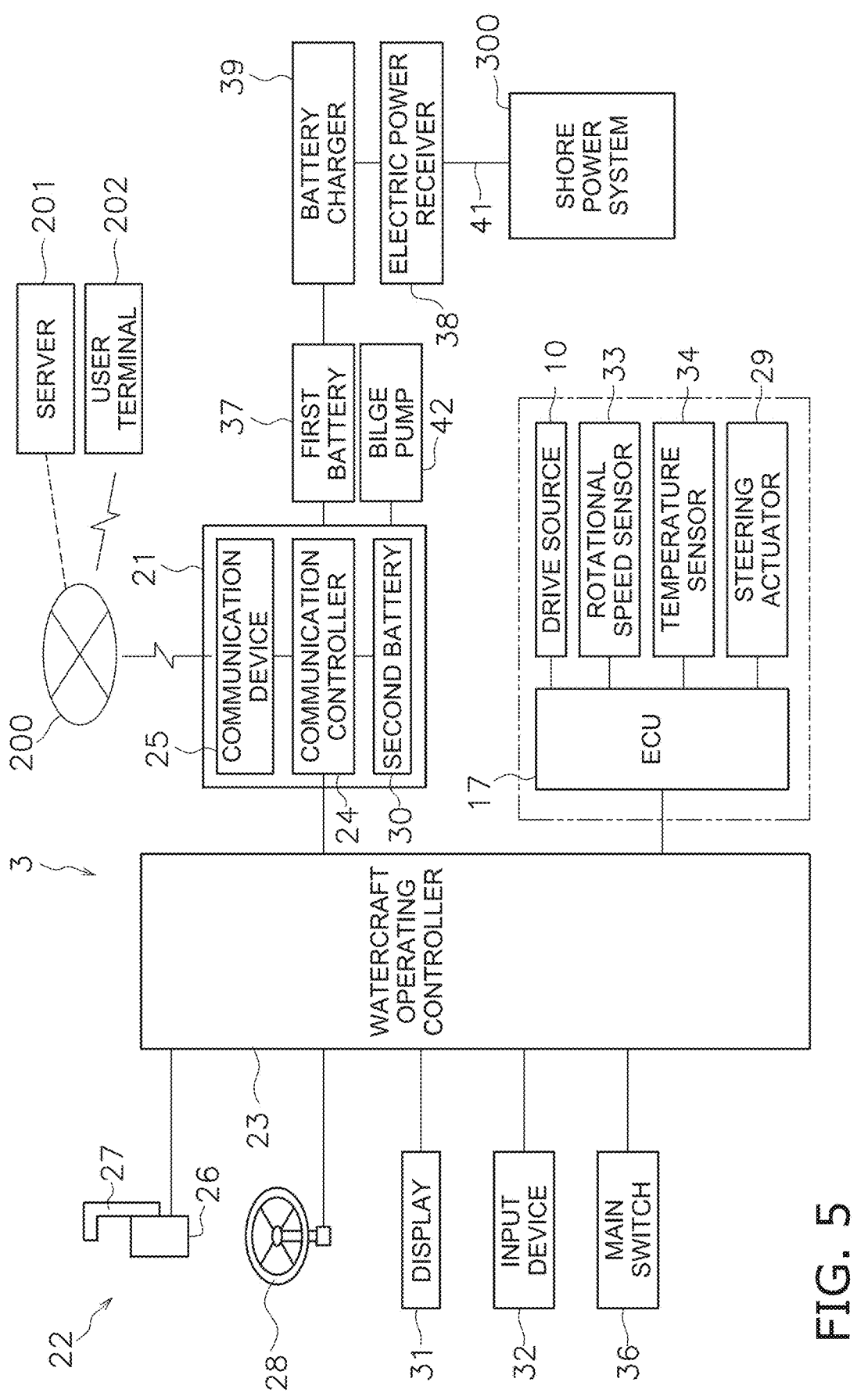
FIG. 5 is a schematic diagram of a control system for a watercraft according to a first modification.

The first device is not limited to the position sensor 35 and may be another type of device. For example, FIG. 5 is a diagram showing a configuration of the control system 3 according to a first modification. As shown in FIG. 5, the device system 22 may include a bilge pump 42. The bilge pump 42 is attached to the bilge of the watercraft 100 and discharges water accumulated in the bilge. The bilge pump 42 includes a float switch, for instance, and is automatically driven in accordance with the level of the water accumulated in the bilge.

The DCM 21 may obtain an operating status of the bilge pump 42 as the first data. In the normal electric power mode, the DCM 21 may send the first data indicating the operating status of the bilge pump 42 to the server 201 at predetermined intervals of time. In the low electric power mode, the DCM 21 may be configured or programmed to send the first data indicating the operating status of the bilge pump 42 to the server 201 when the bilge pump 42 has continuously operated for a predetermined length of time or more. In the low electric power mode, the DCM 21 may be configured or programmed not to send the first data indicating the operating status of the bilge pump 42 when the bilge pump 42 has not continuously operated for the predetermined length of time or more.

Figure 6:
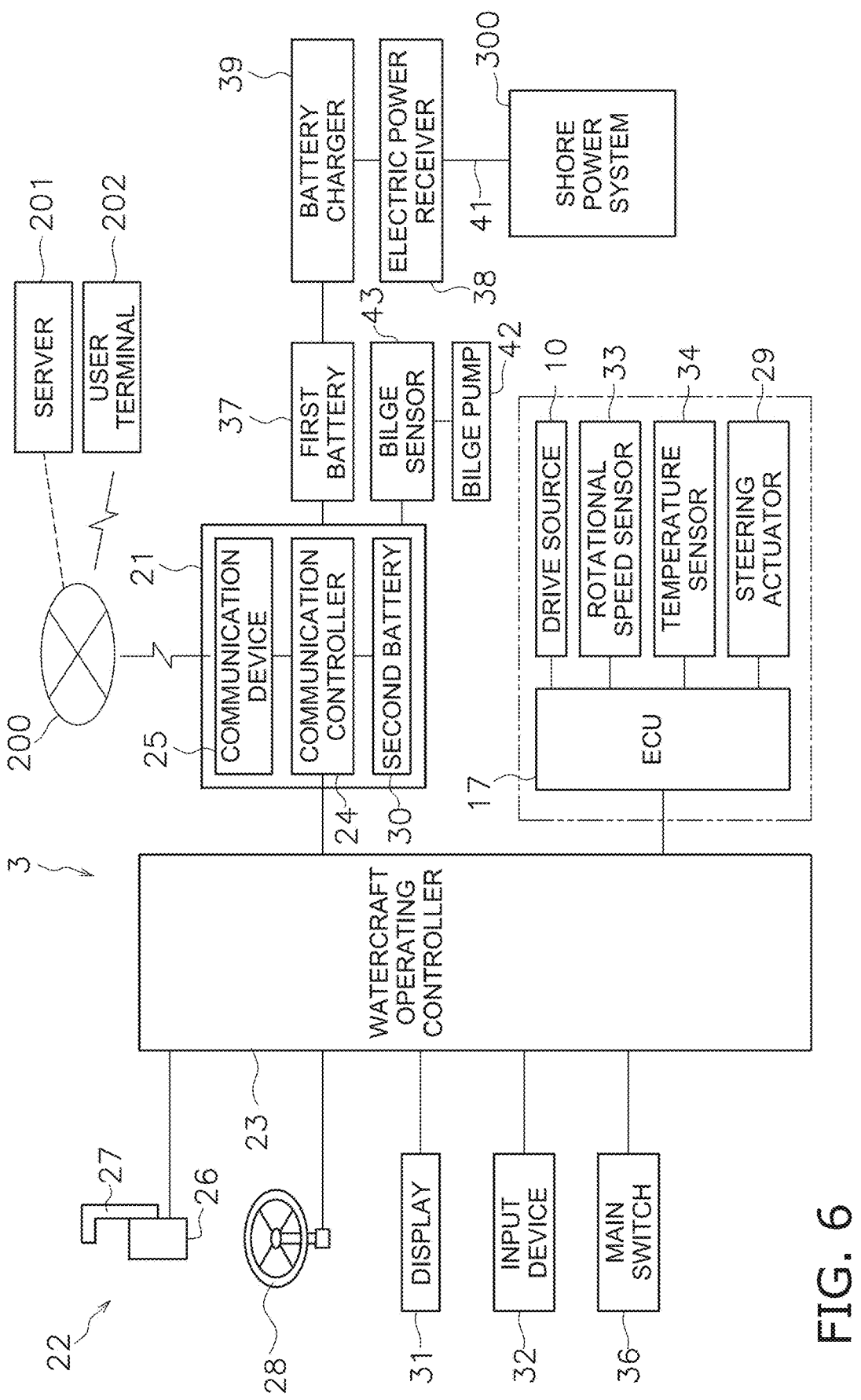
FIG. 6 is a schematic diagram of a control system for a watercraft according to a second modification.

FIG. 6 is a diagram showing a configuration of the control system 3 according to a second modification. As shown in FIG. 6, the device system 22 may include a bilge sensor 43. The bilge sensor 43 detects the level of the water accumulated in the bilge. The bilge sensor 43 outputs a water level signal indicating the level of the water accumulated in the bilge. The bilge pump 42 may be driven in accordance with the level of the water detected by the bilge sensor 43. The DCM 21 may obtain the operating status of the bilge pump 42 as the first data. The DCM 21 may obtain the level of water detected by the bilge sensor 43 as the first data.

In the normal electric power mode, the DCM 21 may enable the user terminal 202 to operate the device system 22 from a distance. In the low electric power mode, the DCM 21 may disable the user terminal 202 to operate the device system 22 from a distance. With these configurations, battery running out of power is reduced or prevented.

The DCM 21 may determine whether or not an emergency is occurring in the watercraft 100. For example, the DCM 21 may determine that the emergency is occurring based on the water level signal described above. Alternatively, the DCM 21 may determine that the emergency is occurring when the position of the watercraft 100 has shifted by the predetermined distance or more. When it is determined that the emergency is occurring, the DCM 21 may immediately send the first data to the server 201 even in the low electric power mode.

The DCM 21 may determine whether or not the amount of charge in the first battery 37 is less than or equal to a threshold. In the low electric power mode, the DCM 21 may operate with electric power from the first battery 37 when the amount of charge in the first battery 37 is greater than the threshold. In the low electric power mode, the DCM 21 may operate with electric power from the second battery 30 without being supplied with electric power from the first battery 37 when the amount of charge in the first battery 37 is less than or equal to the threshold. With these configurations, the first battery 37 is protected.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft, the system comprising:
  a device system including at least one electric device installed in the watercraft;
  a communication device to perform wireless communication with a server;
  a controller connected to the communication device, and configured or programmed to send device data regarding the device system to the server;
  a first battery installed in the watercraft to provide electric power to the communication device; and
  an electric power receiver installed in the watercraft, connected to the first battery, and operable to receive shore power; wherein
  the controller is configured or programmed to:
    determine whether or not the first battery is connected to the shore power;
    send the device data to the server in a normal electric power mode when the first battery is connected to the shore power;
    determine whether or not a low electric power condition is satisfied, the low electric power condition including a condition that the first battery is not connected to the shore power;
    send the device data to the server in a low electric power mode when the low electric power condition is satisfied; and
    reduce data traffic of the device data to be sent to the server in the low electric power mode compared to when in the normal electric power mode;
  the at least one electric device includes a first device and a second device;

the device data includes first data regarding the first device and second data regarding the second device; and the controller is configured or programmed to:

send the device data including the first data and the second data to the server in the normal electric power mode; and send the device data including the first data to the server in the low electric power mode without including the second data in the device data.

2. The system according to claim 1, wherein the first device is a position sensor to detect a position of the watercraft; and the first data indicates the position of the watercraft.

3. The system according to claim 2, wherein the controller is configured or programmed to:

send the first data indicating the position of the watercraft to the server at predetermined intervals of time in the normal electric power mode; and send the first data indicating the position of the watercraft to the server in the low electric power mode when the position of the watercraft has shifted by a predetermined distance or more.

4. The system according to claim 1, wherein the first device is a bilge pump to discharge water accumulating in a bilge of the watercraft; and the first data indicates an operating status of the bilge pump or a level of the water accumulated in the bilge.

5. The system according to claim 4, wherein the controller is configured or programmed to:

send the first data indicating the operating status of the bilge pump to the server at predetermined intervals of time in the normal electric power mode; and send the first data indicating the operating status of the bilge pump or the level of the water accumulated in the bilge to the server in the low electric power mode when the bilge pump has continuously operated for a predetermined length of time or more, or when the level of the water accumulated in the bilge is greater than or equal to a predetermined value.

6. The system according to claim 1, wherein the controller is configured or programmed to:

enter a sleep mode to stop communicating with the server in the low electric power mode;

be switched from the sleep mode to a wake-up mode on a regular basis;

determine whether or not the controller has received a command signal from the server in the wake-up mode; and send the device data to the server when the controller has received the command signal from the server.

7. The system according to claim 6, wherein the server is configured or programmed to continue to send the command signal to the communication device at predetermined intervals of time.

8. The system according to claim 1, wherein, when the controller is in the low electric power mode, the controller or the server is configured or programmed to notify a user terminal that the controller is in the low electric power mode.

9. The system according to claim 1, wherein the controller is configured or programmed to be switched to the low electric power mode in response to a command signal from a user terminal.

10. The system according to claim 1, wherein the controller is configured or programmed to be switchable to a storage mode to reduce the data traffic of the device data to be sent to the server compared to when in the low electric power mode.

11. The system according to claim 10, wherein the controller is configured or programmed to be switched from the low electric power mode to the storage mode in accordance with operating circumstances of the device system.

12. The system according to claim 1, wherein the low electric power condition further includes a condition that a predetermined length of time or more has elapsed since disconnection of the first battery from the shore power; and the controller is configured or programmed to send the device data to the server in the normal electric power mode until an elapse of the predetermined length of time since disconnection of the first battery from the shore power.

13. The system according to claim 1, wherein the controller is configured or programmed to disable the at least one electric device to be operated in the low electric power mode.

14. The system according to claim 1, further comprising:

a data communication module including the communication device, the controller, and a second battery to provide electric power to the communication device and the controller; wherein the controller is configured or programmed to:

determine whether or not an amount of charge in the first battery is equal to or less than a threshold; and operate with electric power from the second battery without electric power from the first battery when the amount of charge in the first battery is equal to or less than the threshold.

15. A method of controlling a watercraft including a device system, a communication device, a first battery, and an electric power receiver, the device system including at least one electric device installed in the watercraft, the communication device operable to perform wireless communication with a server, the first battery installed in the watercraft, the first battery to provide electric power to the communication device, the electric power receiver installed in the watercraft, connected to the first battery, and operable to receive shore power, the method comprising:

sending device data regarding the device system to the server;

determining whether or not the first battery is connected to the shore power;

sending the device data to the server in a normal electric power mode when the first battery is connected to the shore power;

determining whether or not a low electric power condition is satisfied, the low electric power condition including a condition that the first battery is not connected to the shore power;

sending the device data to the server in a low electric power mode when the low electric power condition is satisfied; and reducing data traffic of the device data to be sent to the server in the low electric power mode compared to when in the normal electric power mode; wherein the at least one electric device includes a first device and a second device, and the device data includes first data regarding the first device and second data regarding the second device, the method further comprising:

sending the device data including both the first data and the second data to the server in the normal electric power mode; and sending the device data including the first data to the server without including the second data in the device data in the low electric power mode.

16. The method according to claim 15, wherein the first device is a position sensor to detect a position of the watercraft; and the first data indicates the position of the watercraft.

17. The method according to claim 16, further comprising:

sending the first data indicating the position of the watercraft to the server at predetermined intervals of time in the normal electric power mode; and sending the first data indicating the position of the watercraft to the server in the low electric power mode when the position of the watercraft has shifted by a predetermined distance or more.

18. The method according to claim 15, wherein the first device is a bilge pump to discharge water accumulated in a bilge of the watercraft; and the first data indicates an operating status of the bilge pump or a level of the water accumulated in the bilge.

* * * * *